Jan. 30, 1968  HIDEO MORI  3,366,952
CODED IDENTIFICATION MEMBERS
Filed Oct. 10, 1966  2 Sheets-Sheet 1
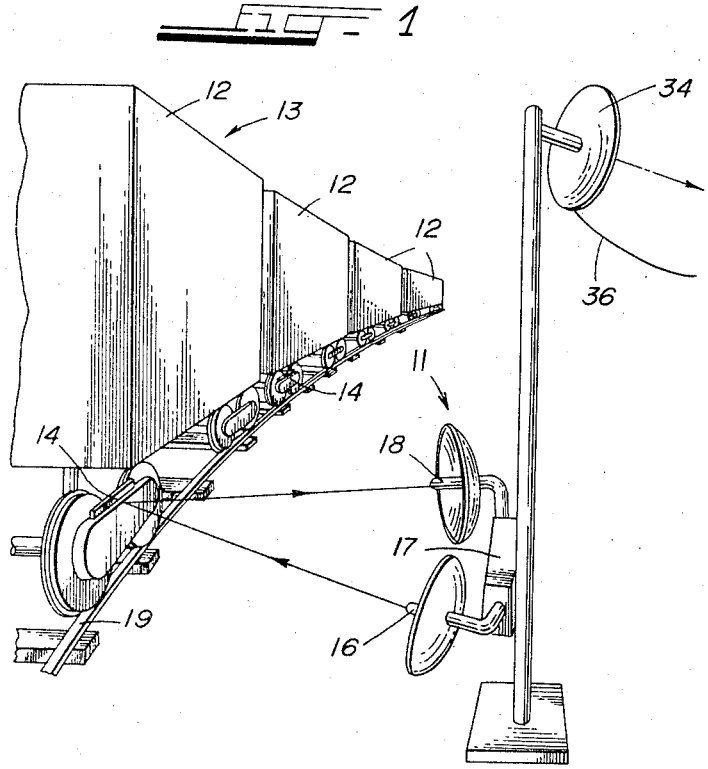
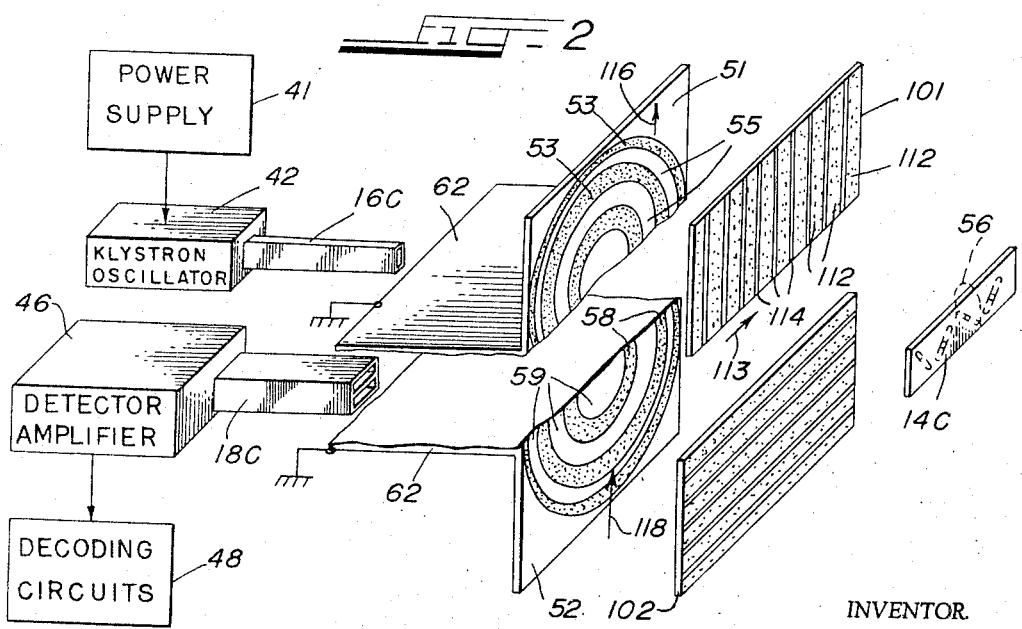
INVENTOR.
HIDEO MORI
BY
Wallace, Kinzer & Dorn
ATTYS.

Jan. 30, 1968     HIDEO MORI     3,366,952
CODED IDENTIFICATION MEMBERS
Filed Oct. 10, 1966     2 Sheets-Sheet 2
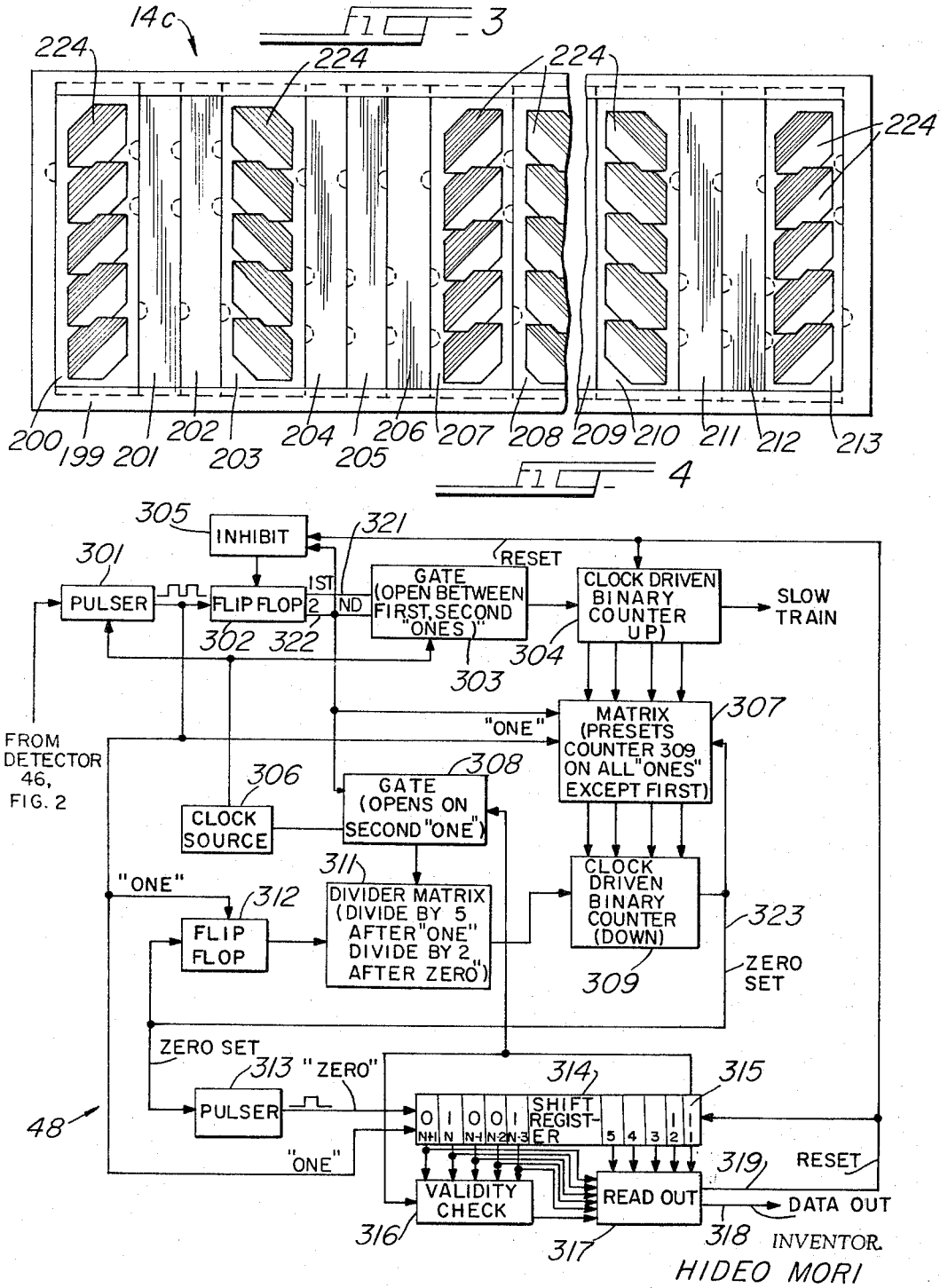

United States Patent Office 3,366,952
Patented Jan. 30, 1968

3,366,952
CODED IDENTIFICATION MEMBERS
Hideo Mori, Woodland Hills, Calif., assignor to Abex Corporation, New York, N.Y., a corporation of Delaware
Continuation-in-part of application Ser. No. 498,795, Oct. 20, 1965. This application Oct. 10, 1966, Ser. No. 585,420
5 Claims. (Cl. 343—6.5)

This application is a continuation-in-part of application Ser. No. 498,795, filed Oct. 20, 1965, now Patent No. 3,311,915.

This invention relates to a new and improved apparatus for automatic identification of objects, including identification of railroad cars and locomotives and like vehicles. More particularly, the invention relates to an improved identification member construction for use in an automatic signal identification system for railroad cars and other large objects.

It is critically important for railroad management to know, at all times, the locations of the locomotives and cars of a railroad system. If a car is loaded, identification of its location enables the railroad to keep the shipper and receiver posted as to progress of the car. If a car is empty, information as to its location is essential to enable use of the car when it is needed. Moreover, because both locomotives and cars require periodic service, continuing information regarding their location is important to proper servicing. The same and similar considerations apply to identification of trucks, automobiles, and other vehicles and large objects in varying fields of activity.

A number of different systems have been proposed to provide for automation of the reporting and recording of railroad car and locomotive location information. One particularly advantageous system is described in detail in Patent No. 3,247,509 to Omer F. Hamann and Sherman H. Boyd. In that system, each railroad car and locomotive is provided with a relatively small coded microwave reflector identification member, each coded identification member including a plurality of individual microwave reflector elements. The system further includes a roadside scanning station comprising a source of microwave signals and a microwave transmitter antenna that is coupled to the signal source. The microwave signals are radiated from the transmitter antenna and are reflected back from each coded identification member traversing the scanning station to impinge upon a receiver antenna. The coded information represented by the reflected microwave signals is subsequently detected and processed to identify the individual railway vehicles passing through the scanning station.

In the aforementioned Hamann and Boyd microwave vehicle identification system, the code signals from the identification members are changed in polarization from the original radiated signals from the microwave transmitter antenna. Thus, that system employs rotation in two different directions, from the original polarization, in order to distinguish binary "ones" from binary "zeros." But rotation in polarization of the reflected signal is also advantageous in distinguishing that signal from the originally transmitted signal, substantially eliminating the effect of cross-talk from the transmitting antenna to the receiving antenna. Even in a system in which synchronous detection is employed, such as that disclosed in Patent No. 3,247,508 to William R. Bradford, Steven Molnar and Bruce H. Siperly, in which only one binary quantity is actually represented by reflected signal pulses from the identification member, it is still advantageous to provide for a change in polarization of the signal reflection from the identification member. A particularly advantageous form of coded target structure, utilizing corner reflectors as the individual code elements, is described and claimed in Patent No. 3,247,510 to Steven Molnar and Bruce H. Siperly.

Even with small retro-reflective code elements, such as corner reflector code elements, the total length of the identification member remains a problem. This is particularly true if it is desired to make a parity check or similar check of accuracy in the identification process. Thus, it is highly desirable to find some means to reduce the overall length of the identification member while at the same time making adequate provision for a check of accuracy in the scanning and decoding operations of the system.

It is a principal object of the present invention, therefore, to provide a new and improved coded identification member, for use in an automatic object identifying system, that provides for an effective and substantially complete check on accuracy of the scanning of the identification member.

Another object of the invention is to increase the efficiency and accuracy of an automatic object identifying system, based upon the reflection of microwave or other radiant signals, while at the same time decreasing the overall size of the identification members. A specific object of the invention is to provide for improved accuracy checking in an automatic object identification system using microwave energy or other radiant energy reflected from coded identification members, and at the same time reduce the size of the identification members, by establishing a preferred relationship between the dimensions of reflecting and non-reflecting code elements.

Other and further objects of the present invention will be apparent from the following description and claims and are illustrated in the accompanying drawings which, by way of illustration, shows a preferred embodiment of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a partially schematic perspective view of a scanning station for an automatic object identifying system of the kind in which the present invention is employed;

FIG. 2 is a partially schematic, partially exploded perspective view of one form of focussing lens system that may be employed in the identification apparatus of FIG. 1;

FIG. 3 is a front elevation view of a fully assembled coded identification member constructed in accordance with a preferred embodiment of the present invention; and FIG. 4 is a block diagram of decoding circuits used in interpreting and checking the identification data derived from the system of FIGS. 1-3.

FIG. 1 illustrates an automatic railway car identifying apparatus 11 constructed in accordance with the system disclosed in the above-identified Patent No. 3,247,509 of Omer F. Hamann and Sherman H. Boyd and generally illustrative of one kind of automatic identification apparatus in which the present invention may be employed. The apparatus 11 constitutes a trackside scanning station and may be a part of a system including two or more essentially similar stations. The identification apparatus 11 includes a transmitting antenna 16 and a receiving antenna 18 both connected to a circuit unit 17. The circuit unit 17 may be coupled to a centralized data processing station (not shown) by suitable means such as a transmission link comprising an antenna 34 or by a conductive line 36.

A train 13 moving past the identification apparatus 11 at the scanning station moves each individual car 12 along a given path, determined by the track 19, past the antennas 16 and 18. Each car 12 carries an elongated identification member 14. Each identification member 14 is provided with a plurality of individual code reflector elements that are arranged in accordance with a predetermined code pattern as described more fully hereinafter. The identification members are mounted on the respective railroad cars 12 or like vehicles at a suitable location coinciding with the common focus of the two antennas 16 and 18. One suitable location for the identification plates 14, on the railway cars 12, is on the wheel carriages or trucks immediately above the springs, this location being substantially standardized with respect to height above the railway track 19.

Other and different mounting arrangements may be employed, so long as the identification plates traverse the required path coincident with the common focus of the antennas 16 and 18. The location of the identification members 14 lengthwise of the cars 12 is not critical; either truck on any given car may be selected for mounting the identification member, or the plates may be mounted at the mid-points of the cars. Preferably, there are two plates 14 for each car, one identification plate on each side of the car, so that it is not necessary to duplicate the identification apparatus 11 on the opposite side of the track 19.

In operation, a microwave signal from the circuit unit 17 is supplied to the transmitting antenna 16 and is radiated toward a scanning position traversed by the identification members 14. The polarization of the radiated signal is controlled so that virtually all of the radiation is limited to a given initial polarization. The radiated signal is intercepted and reflected, by the individual code reflector elements of each identification member 14, back to the receiving antenna 18. Preferably, the reflected signals are changed in polarization through an angle of approximately 90° to enable the receiving antenna 18 to distinguish the reflected signals from the initially radiated signals from transmitting antenna 16.

Reflected signals impinging upon the antenna 18 are detected to produce a pulse signal representative of the position code of the individual reflector elements along the length of the identification member 14. This pulse signal is supplied, from the circuit unit 17, to suitable storage and data processing apparatus to identify each of the railroad cars 12 moving through the scanning station at which the apparatus 11 is located.

FIG. 2 illustrates a lens system constructed in accordance with one embodiment of the invention disclosed in the aforementioned Bradford et al. Patent No. 3,247,508. This lens system is utilized in conjunction with a transmitting apparatus that is essentially similar to that described above in connection with FIG. 2. The signal source for the system comprises a klystron oscillator 42 energized from a suitable power supply 41. The klystron oscillator is connected to a transmitting waveguide 16C that, in this instance, radiates a horizontally polarized microwave signal. The outlet of the radiating waveguide 16C is located immediately above a grounded conductive septum 62 that extends from the waveguide to a microwave zone plate lens 51. The radiating source represented by the right-hand end of the waveguide 16C is located approximately at one focus of the lens 51. The outer focus of the lens is coincident with a path along which the vehicle identification members 14C are moved.

The receiving portion of the lens system is substantially similar to the transmitting portion. A second zone plate lens 52 is provided for focusing the reflected signals from the identification member 14C back to the end of a receiving waveguide 18C, located immediately below the left-hand edge of the septum 62. Preferably, the waveguide 18C is provided with a horizontally extending internal septum to reduce effective reception of horizontally polarized signals. The receiving waveguide 18C is connected to a suitable detector and amplifier circuit 46 in turn connected to de-coding circuits 48.

The lens system of FIG. 2 also includes a first polarization grid 101 interposed between the transmitting lens 51 and the identification member 14C being scanned. A similar polarization grid 102 is interposed between the identification member and the second or receiving antenna 18C. In the illustrated arrangement, the second polarization grid 102 is located between the identification member 14C and the lens 52, although it could be disposed on the opposite side of the lens. The structures of the zone plate lenses 51, 52 and of the polarization grids 101 and 102 are fully described in the aforementioned Bradford et al. Patent No. 3,247,508.

In operation, a microwave signal developed by the klystron oscillator 42 is radiated by the transmitter antenna wave guide 16C, and is focused upon the identification member 14C by the lens 51. The signal as originally radiated from the antenna 16 is horizontally polarized. As the signal is transmitted through the lens 51, some vertically polarized components are introduced, particularly along those parts of the lens extending at angles of 45° from the lens axis.

The horizontally polarized components of the radiated signal are transmitted without substantial attenuation through the polarization grid 101 to afford the desired horizontally polarized signal 113 impinging upon the identification member 14C. To the vertically poralized components passed by the lens 51 (see arrow 116) the grid 101 represents an effective short circuit. That is, to these signals the grid 101 appears as a wave guide operating beyond cutoff.

The microwave signal impinging upon the identification member 14C, as generally indicated by the focal outline 56 in FIG. 2, excites an individual reflector element on the identification member whenever that element is well located within the focus. As a result, the signal is reflected and re-radiated, but with a change in polarization through an angle of plus or minus 90°, depending upon the orientation of the reflector. Thus, the reflected signal impinging upon the second polarization grid 102 is vertically oriented. However, there are other stray reflections with a horizontal polarization, particularly if the identification member 14C is made of a conductive material.

The second polarization grid 102 is essentially identical in construction to the grid 101 except that it is oriented at an angle of 90° relative to the first grid. Thus, the polarization grid 102 passes vertically polarized signals without substantial attenuation. But horizontally polarized signals are effectively shorted out by the grid structure 102 and are not passed on to the lens 52. Accordingly, the signal reaching the second or receiving lens 52 is effectively limited to a vertically polarized signal as indicated by the arrow 118. This signal is focused, by the lens 52, upon the receiving antenna wave guide 18C.

In FIG. 2, the polarization grids 101 and 102 have been displaced from the lenses 51 and 52 for clarity of illustration. In actual practice, the polarization grids are mounted quite close to the lenses. Indeed, the preferred arrangement is to mount the polarization grids directly on the surface of the two Fresnel lenses. The same dielectric sheet that is employed as a part of each of the two lenses 51, 52 may also be utilized as the support member for the polarization grids 101, 102, since the raised or conductive bands affording the lens action are disposed on the surface of the lens dielectric facing the two antennas. This makes it possible to apply the conductive elements 112 affording the polarization grid on that surface of the same lens dielectric that faces the identification member 14C.

FIG. 3 illustrates a coded identification member 14C constructed in accordance with the present invention. Identification member 14C comprises an elongated base constituting a frame 199 that is adapted to be mounted on one of the objects to be identified, such as one of the cars 12 in the train 13 (FIG. 1). The frame or base 199 holds a plurality of individual code elements 200–213 in aligned relationship to each other.

In a practical identification member structure, as used in a freight car identification system, there may be as many as fifty or more of the individual code elements 200–213; in one system the total requirement is for fifty-two individual code elements. The precise number required is determined by system requirements and not by the structural features of the code elements themselves, since each code element represents one digit in an identification code. The complete grouping of code elements can be formed as a single, integrated casting, but physically distinct code elements are preferred, as described hereinafter.

The code elements 200–213 are of three distinct types. Of the code elements shown in the assembly illustrated in FIG. 3, elements 200, 207 and 213 are of a first type representative of a binary "one" and referred to hereinafter as type A. Code elements 203, 208, and 210 are of a second type, referred to hereinafter as type B, that is also representative of a binary "one" but that is somewhat different structurally from the type A code elements. The third type of code element, sometimes referred to hereinafter as type C, is a blank code element representative of a binary "zero." In the assembly 14C of FIG. 3, code elements 201, 202, 204, 205, 206, 209, 211 and 212 are of type C.

The opposite ends of the individual code elements are provided with projecting flanges that are engaged by the frame 199 to mount the code elements in the assembled identification member. The front surfaces of the code elements may be flat; preferably, however, they constitute convex surfaces. In the face of each code element of types A and B, there are a plurality of individual corner reflector depressions 224. If the interrogating signal from the microwave scanner is polarized in a horizontal direction, as assumed in connection with the description of FIG. 2, the apexial axes of the individual corner reflectors 224 are each oriented at an angle of 45° to the horizontal.

The code elements of type B (code elements 203, 208 and 210) are substantially identical to the type A code elements (code elements 200, 207 and 213) except for the alignment of the corner reflector axes with respect to the incident polarized signal. Thus, the apexial axes of the type A code elements are oriented at an angle of 45° counterclockwise relative to the horizontal, assumed to be the direction of initial polarization for the identification system. The individual apexial axes of the type B corner reflectors, on the other hand, are each preferably oriented at an angle of 45° clockwise relative to the horizontal, the initial direction of polarization.

The third type of code element, employed to signify binary zeros in the identification member 14C, is represented by code elements 201, 202, 204, 205, 206, 211 and 212. The front surface of each of these code elements is a smooth surface, the contour being broken only by the mounting flanges at the opposed ends of the code element. Preferably, the surface of each type C element is a convex surface corresponding in curvature to the external surface of the type A and B reflector code elements. This is not essential; a flat surface can also be used on the blank type C code elements.

As pointed out in the aforementioned Patent No. 3,247,510, it is highly desirable that the apexial axes of adjacent corner reflector elements be oriented at angles of 90° relative to each other in order to achieve effective monopulse operation and to make sure that adjacent binary ones are fully distinguished from each other. This is true even if there is an intervening blank or binary zero between any two binary ones. The desired alternate angular relation can be consistently achieved by careful control in fabrication, particularly if this is done at a central point. But it is usually desirable to provide for assembly of individual code elements into identification members at several locations, multiplying the possibilities of error in this regard. In the code elements constructed in accordance with the present invention, the desired alternate mounting arrangement for the type A and type B code elements is assured by a system of interlocking lugs connecting adjacent code elements, as described in the aforementioned application Ser. No. 498,795.

If a conventional parity check is to be employed with an identification member such as member 14C (FIG. 3) conventional practice requires the addition of several "positive reflection" bits, binary ones in the system described above, so that it will always be possible to have the same total number of binary ones in each code message. This form of parity check, therefore, inevitably adds to the total length of the identification member. The identification member tends toward an ungainly length to begin with, and the additional length required for a conventional parity checking system is quite undesirable.

In the preferred form of identification member illustrated in FIG. 3, provision is made for an accurate and effective parity check without addition of separate parity spaces. This is accomplished by fabricating the individual code elements with different widths for binary zeros and binary ones. In the illustrated construction, a ratio of two to one is employed for this purpose, the binary zeros (code elements 201, 202, 204, 206, 211 and 212) each having a width equal to one-half the width of the binary ones (code elements 200, 203, 207, 210, 213).

In detecting and processing code data from the identification member 14C, there are several possible errors that may occur. Thus, a binary one represented by a positive reflector element may be missed by the receiving equipment. A superfluous binary one may be inserted due to erroneous operation of the receiving equipment, although this is quite rare. In the processing of the data signals developed by the receiving equipment, operating on a synchronous basis, superfluous zeros may be inserted or the equipment may fail to insert the proper number of zeros; the possibility of this error is readily apparent when it is realized that zeros are represented by a failure to reflect the interrogating signal and must be inserted from a clock pulse source in the processing equipment.

With code elements of different widths for binary ones and binary zeros, and specifically with the 2:1 ratio described above and illustrated in FIG. 3, the parity check can be effected by checking the number of bit positions filled in a storage register upon recording of the code signal developed by the receiver portion of the scanning apparatus. If an inadequate number of zeros has been inserted by the synchronous processing equipment, then the storage register will not be filled completely and an error is indicated. Any excessive insertion of zeros will cause the message to go beyond the predetermined capacity for the register and will automatically indicate an error. A loss of any positive binary one signal will cause the message to be too long because the processing equipment will automatically insert two zeros in place of a binary one due to the width differential between the binary ones and the binary zeros on the identification member. Of course, any additional and spurious binary one developed by the receiving equipment will cause an overflow of the storage register and will indicate an error. Thus, by the simple process of establishing the width of the binary zero code elements at a small integral fraction of the width of the binary one code elements, and preferably with a ratio of 2:1 as described above, provision is made for a simple and effective parity check without adding in any way to the length of the identification member.

It will be apparent, from the foregoing description of the relationship between the widths of the code elements representing binary ones and those representing binary zeros, that the overall length of the identification member 14C, insofar as the code data portion is concerned, may vary, depending upon the total number of binary ones and binary zeros in the code message. This presents no substantial problem, however, since the effective code length is identical for each message. To meet the physical requirements of a single length base or frame 199, the frame is made big enough to accommodate a message of maximum physical length and any unused length for a physically short message is filled with blank code elements located beyond the ends of the code data portion of the message.

FIG. 4 illustrates, in a simplified block diagram, one form of apparatus that may be utilized as the decoding circuits 48 (FIG. 2) for decoding the received information from the identification members and for checking the validity of the decoded information. Decoding circuits 48, in the form illustrated in FIG. 4, comprise a pulser circuit 301 having an input connected to the detector amplifier 46 (see FIG. 2). Pulser 301 is also provided with a second input from a clock source 306. The operating frequency for the clock source is not critical; in a typical installation, the clock frequency may be one hundred kilocycles.

The output from the pulser circuit 301 is coupled to a bi-stable trigger, flip-flop circuit 302. One of the two outputs of flip-flop circuit 302 is connected to a gate circuit 303. The other output of flip-flop 302 is connected to gate 303 and is also connected to an inhibit circuit 305, a counter-setting matrix 307, and a gate circuit 308, circuits 305, 307, and 308 being described more fully hereinafter. Gate circuit 303 is also provided with an input that is connected to clock source 306, and gate circuit 308 has an input connected to the clock source.

The output of gate 303 is connected to a first binary counter 304 which counts clock pulses supplied to the counter from source 306 through the gate. Individual stages of counter 304 are electrically connected to matrix 307. Matrix 307, in turn, is provided with a plurality of output circuits that are electrically connected to a second binary counter 309. Counter 309 is a down counter; the connections from matrix 307 are utilized to preset this counter to a predetermined initial count for each operation of the decoding circuits 48 as described hereinafter.

The output of gate 308 is electrically coupled to a divider matrix 311. Matrix 311 includes two frequency divider circuits, one of which divides incoming pulse signals by a factor of five and the other of which divides the incoming pulse signals by a factor of two. The output of divider matrix 311 is connected to the input of the binary down counter 309. Selection of the particular divider circuit in matrix 311 to be used at any given time is controlled by a flip-flop circuit 312. One input to flip-flop circuit 312 is taken from the output of pulser circuit 301. Another input to flip-flop circuit 312 is derived from the binary down counter 309, through a circuit 323. Counter 309 produces, on circuit 323, a "zero set" signal indicative of actuation of the counter to a zero count.

The zero set output circuit 323 of counter 309 is also coupled to matrix 307 and to an additional pulser circuit 313. The output of pulser circuit 313 is connected to the initial or input stage of a shift register 314. The input stage of shift register 314 is also provided with a circuit connection from pulser circuit 301. The number of stages in shift register 314 is determined by the number of significant digits in each individual identification member code. For an identification message containing fifty-two digits, for example, including both start and stop codes of 1001 (see FIG. 3), shift register 314 would be provided with a total of fifty-one stages. The initial or input stage of shift register 314 is designated as stage $N+1$, the next succeeding stage is stage $N$ and the following stages are designated respectively as $N-1$, $N-2$, and $N-3$. Intermediate stages of the shift register have been omitted from the drawing, the terminal stages of the shift register at the right-hand side thereof as shown in FIG. 4 being designated as stages one through five. The terminal stage 315 of the shift register, its one stage, has an output circuit that is electrically connected to gate 308.

The initial five stages of shift register 314 are individually electrically connected to validity check circuit 316. The terminal stage 315 is also connected to circuit 316. The output of circuit 316 is coupled to a readout circuit 317. The readout circuit is also electrically connected to each of the individual stages of shift register 314 and affords a means for reading out the data from the shift register for recording or computation purposes, the output connection being designated by reference numeral 318. Readout circuit 317 also has a reset output circuit 319 that develops a reset signal whenever readout of the shift register is completed. The reset circuit 319 is electrically connected to inhibit gate 305, counter 304 and shift register 314 to reset each of these circuits for each cycle of operation of the decoding circuits 48.

In considering operation of the decoding circuits 48 illustrated in FIG. 4, it should be understood that the output signal from detector 46 comprises a series of pulses that are displaced from each other, in time, in accordance with the physical displacement of the reflector or binary "one" code elements on the identification member being scanned. These signals are supplied to pulser 301 to actuate the pulser circuit, and the output signals from the pulser circuit are supplied to flip-flop circuit 302. As a given identification member such as that illustrated in FIG. 3 is scanned, the first pulse representative of a binary one triggers circuit 302 to produce an appropriate output signal on its first output circuit 321, which signal actuates gate 303 to an open condition. With gate 303 open, the clock pulses from source 306 are applied to counter 304 and are recorded in the counter.

At this time, gate 308 is closed since there is as yet no actuating signal present on the second output 322 of flip-flop circuit 302. Consequently, there is no output to the divider matrix 311 and no pre-setting signals are supplied to the second counter 309. The initial pulse from circuit 301 is supplied to flip-flop circuit 312 but produces no significant result in the decoding operation. However, the same pulse is also supplied to the first stage of shift register 314 and is recorded therein as a binary one.

The time of occurrence of the second pulse from detector 46, producing a second pulse output from pulser circuit 301, is determined by the spacing between code elements 200 and 203. The two intervening blank code elements 201 and 202 are incorporated in the identification member, for use with the decoding circuits 48, for timing and validity check purposes. Of course, the time interval between the first and second pulses is also determined by the speed of the freight car or other object carrying the identification member past the scanning station.

The second pulse signal from pulser 301 actuates flip-flop circuit 302 to its second stable state, interrupting the previous output signal on circuit 321 and providing an output signal on circuit 322. The output signal on circuit 322 re-actuates gate 303 to its original closed condition. This same signal is supplied to matrix 307 to condition that circuit for operation as described hereinafter. The connection to gate 308 is effective to open that gate, which remains open throughout the operating cycle of the decoding circuits. In addition, the output signal from circuit 322 is applied to the inhibit circuit 305 which in turn supplies an inhibit signal to circuit 302 to prevent that flip-flop circuit from reverting to its alternate bi-stable state until the inhibit gate is subsequently reset. Thus, following the second binary one pulse, flip-flop circuit 302 is maintained in a stable operating condition in which the output from the flip-flop maintains gate 303 closed and maintains circuits 307 and 308 in operating condition.

Matrix 307, having been actuated by the signal from circuit 322, now operates to preset the binary countdown circuit 309 to a count representative of the timing count previously recorded in counter 304. The count to which counter 309 is preset is one-eighth the total count in counter 304. The 1:8 ratio employed is easily determined, since counter 304 is a binary device.

Gate 308, now being open, supplies signals from the clock source 306 to the frequency divider matrix 311. Matrix 311 divides the incoming clock pulse signals by a factor of five and supplies the input signal to countdown circuit 309. The operating condition of flip-flop circuit 312 is not changed and no input signal is presently supplied to pulser circuit 313. However, the second pulse signal from pulser 301, like the first such signal, is supplied to the input stage $N+1$ of shift register 314 and is recorded therein as a binary one, the previously recorded binary one representative of the first pulse signal being shifted to the next stage N of the register.

If the next code element on the identification member being scanned is a binary one, a pulse signal will be received from detector 46 before counter 309 can count down (from the preset value in the counter) to zero. Under these circumstances, the next output signal from pulser 301 actuates matrix 307 to again cause the matrix to preset counter 309 at one-eighth the count retained in counter 304. The pulse signal from circuit 301 is supplied to flip-flop circuit 312, but does not change the operating state of the flip-flop circuit. The same signal is also supplied to the input stage of shift register 314 and is recorded as a binary one, shifting the previously recorded data in the register one stage further.

On the other hand, if the next code element on the identification member is a blank code element representative of a binary zero, counter 309 counts down to zero before a signal pulse is received from detector 46. When this occurs, a zero set signal is produced on circuit 323. This zero set signal is applied to matrix 307 to actuate the matrix and again initiate presetting of counter 309 to one-eighth the pre-recorded count in counter 304. The zero set signal is also applied to flip-flop circuit 312 to actuate that circuit and drive it to its alternate settable condition. As a consequence, the output signal from circuit 312 actuates divider matrix 311 so that the divider matrix now operates with a divisor of two instead of five in determining the input to counter 309. Moreover, the zero set signal is applied to pulser 313 which produces an output signal that is applied to shift register 314 to record a binary zero in the input stage of the shift register. As before, the information previously recorded in the shift register is shifted one stage further into the register.

The decoding and recording of the scanned identification data proceeds as described above for the complete identification member. The last positive return from the identification member is, of course, a binary one. Following recording of this digit in shift register 314, the clock driven binary countdown circuit 309 counts out to zero one more time and records one additional zero in the shift register. This fills the shift register, producing an output signal from the final stage 315 of the shift register that is supplied to gate 308 to actuate that gate to a closed condition. Closing of gate 308 precludes the application of further clock pulses to counter 309, so that no additional zeros will be recorded in shift register 314. If this were not done, the circuit might continue to record zeros indefinitely.

The beginning and ending portions of each of the code identification members are identical, each comprising the binary numeral 1001. For a properly scanned and decoded identification member, these specific digits should be recorded in stages N through $N-3$ of the shift register, with a final zero recorded in stage $N+1$. Circuit 316 can now be actuated by the recorded complete signal from stage 315 of the shift register to check the data recorded in the initial five stages of the shift register, affording a highly effective and substantially complete check on accuracy of the decoded identification data.

Thus, if a binary one has been missed in the scanning of the identification member, two binary zeros will have been developed by decoding circuits 48 and recorded in shift register 314 in the time interval encompassing the scanning of that binary one. This results in a message that is too long and that has a binary one recorded in the $N+1$ stage of shift register 314, a situation that is readily determined by the validity check or comparator circuit 316. If an additional binary one is sensed from the identification member, a corresponding result is produced, the overall message again being too long. On the other hand, in the event that a binary zero fails to be generated at the proper time, the message is too short and binary zeros appear in both of the first two initial stages $N+1$ and N of shift register 314. It is thus seen that for any correct message stages N and $N-3$ in shift register 314 must have binary ones recorded therein and stages $N+1$, $N-1$ and $N-2$, must have recorded binary zeros. Any other condition indicates an erroneously decoded message.

If the validity check or comparison in circuit 316 indicates an accurately decoded message, the readout circuit 319 is actuated to read out the data from shift register 314 to apropriate recording or computing apparatus. When readout is complete, a reset signal on circuit 319 resets inhibit gate 305, counter 304, and register 314 for a new identification member decoding operation, which proceeds as described above.

It is not essential to the present invention that corner reflectors be utilized as the active binary one code elements. Other forms of microwave reflectors can be employed. Moreover, the same width relationship can be utilized in optical systems using retroreflective code elements, preferably with a polarization shift like that of the microwave system described in detail and illustrated in the drawings. The relation between the width of the positive reflector elements and the passive elements is preferably maintained at 2:1 but other ratios can be utilized with appropriate changes in the mathematical relations in the decoding circuits. The selection of a ratio of 8:1 between counters 304 and 309 is not essential to the decoding operation but is predicated upon the particular width relationships for the start and finish binary codes in the particular example described in this application. If somewhat different start and finish codes are desired, the relation between the two counters in a decoding circuit like circuit 48 can be changed to fit the physical requirements of the identification members; the 8:1 ratio has been utilized primarily because it is easily incorporated in decoding circuits using binary counters.

Hence, while preferred embodiments of the invention have been described and illustrated, it is to be understood that they are capable of variation and modification.

I claim:

1. A coded identification member for use in an automatic object identifying system in which individual objects are identified at a scanning station including a source of a radiant energy signal, radiating means for radiating said signal along a given reference path, and receiving means for receiving such radiant energy signal upon reflection from an identification member traversing said path, said identification member comprising:

a plurality of code elements disposed immediately adjacent each other, at predetermined code positions, in a direction transverse to said path, said code elements comprising first and second distinct types, said code elements of said first type being representative of one binary value and each having a reflective surface of given configuration that reflects said radiant energy signal in a form that can be sensed by said receiving means, said code elements of said second type being representative of an alternate binary value and each having a surface of given configuration that cannot reflect said radiant energy signal in a form that can be sensed by said receiving means, said code elements of said second type having a given width and said code elements of said first type having a predetermined width that is a small integral multiple of said given width.

2. A coded identification member according to claim 1 in which the width of said first type code elements is twice the width of said second type code elements.

3. A coded identification member according to claim 1, for use in a system wherein said radiant energy signal is radiated polarized in a given initial direction and said receiving means is limited to reception of signals polarized in a second and substantially different direction, in which said reflective surfaces of said first type code elements change the polarization of the reflected signal to said second direction.

4. A coded identification member according to claim 3, for use in a system in which said radiant energy signal is a microwave signal, in which each of said first type code elements includes at least one corner reflector having its apexial axis disposed at an angle of 45° to said direction of initial polarization.

5. A coded identification member according to claim 1 in which said first type code elements represent binary ones, said second type elements represent binary zeros, and the first and last code groups of the identification member are each 1001.

No references cited.

RODNEY D. BENNETT, *Primary Examiner.*

M. F. HUBLER, *Assistant Examiner.*